United States Patent [19]

Poole et al.

[11] Patent Number: 5,401,790
[45] Date of Patent: Mar. 28, 1995

[54] WATERBORNE COATING COMPOSITIONS HAVING IMPROVED SMOOTHNESS

[75] Inventors: James E. Poole, Gibsonia; Roxalana L. Martin, Pittsburgh, both of Pa.

[73] Assignee: PPG Industries, Inc., Pittsburgh, Pa.

[21] Appl. No.: 220,658

[22] Filed: Mar. 31, 1994

[51] Int. Cl.$^6$ .......................... C08K 5/16; C08K 5/20; C08K 5/21; C08L 75/00

[52] U.S. Cl. ................................. 524/199; 524/198; 524/210; 524/211; 524/212; 524/215; 524/227; 524/591; 524/839; 524/845; 524/608

[58] Field of Search ............... 524/198, 199, 210, 211, 524/212, 215, 227, 591, 839, 845, 608

[56] References Cited

U.S. PATENT DOCUMENTS

| | | | |
|---|---|---|---|
| 4,007,154 | 2/1977 | Schimmel et al. | 523/435 |
| 5,011,881 | 4/1991 | Fujii et al. | 524/457 |
| 5,055,542 | 10/1991 | Hönel et al. | 528/45 |
| 5,071,904 | 12/1991 | Martin et al. | 524/458 |

OTHER PUBLICATIONS

Naé et al., "Rheological Properties of Associative Thickeners in Water Based Coatings," *Rheology 91*, 1991, vol. 1, No. 3, pp. 170–178.

*Primary Examiner*—Peter Szekely
*Attorney, Agent, or Firm*—Krisanne Shideler; William J. Uhl

[57] ABSTRACT

Waterborne coating compositions comprising polymeric film-forming resins and about 0.1 to 5 percent by weight based on weight of resin solids of an oligomer containing from about two to four urethane, urea, or amide moieties per molecule and two or more moieties selected from the group consisting of hydroxyl and tertiary amine. The oligomer improves the smoothness of the resulting coating.

11 Claims, No Drawings

WATERBORNE COATING COMPOSITIONS HAVING IMPROVED SMOOTHNESS

FIELD OF THE INVENTION

The present invention relates to waterborne coating compositions, and more particularly to waterborne coating compositions having improved smoothness and improved appearance upon application to a substrate.

BACKGROUND OF THE INVENTION

An ongoing trend in the automotive industry has been to develop coating systems which provide glossy, mirror-like finishes. This mirror-like quality of an automotive coating system is referred to as "distinctness of image", a property which is directly affected by the smoothness of the coatings. Recently, there has also been an effort in the automotive industry to reduce atmospheric pollution due to volatile solvents emitted during the painting process. One approach to this end has been to develop waterborne coating compositions. Unfortunately, many of the waterborne coating compositions deposit as a rough film under varying conditions of humidity. Although smooth films can be obtained if the humidity is controlled within narrow limits, this often is not possible in an industrial setting without considerable expense. Therefore, it would be desirable to provide a waterborne coating composition which is useful as an original finish for automobiles and which can be applied as a smooth film over a wide range of humidity conditions.

SUMMARY OF THE INVENTION

In accordance with the present invention, a waterborne coating composition is provided which comprises a polymeric film-forming resin in aqueous medium and from about 0.1 percent to about 5 percent of an oligomeric material containing from about 2 to about 4 urethane, urea, or amide moieties per molecule, and two or more moieties selected from the group consisting of hydroxyl and tertiary amine.

DETAILED DESCRIPTION

The film-forming waterborne coating composition of the present invention can be any of the waterborne compositions useful in coatings applications, particularly automotive applications. The waterborne coating composition of the present invention is preferably used as the colored base coat layer in a "color-plus-clear" coating system. The film-forming composition comprises a resinous binder and a pigment to act as the colorant. Particularly useful resinous binders are acrylic polymers, polyesters, including alkyds, and polyurethanes.

The acrylic polymers are copolymers of one or more alkyl esters of acrylic acid or methacrylic acid optionally together with one or more other polymerizable ethylenically unsaturated monomers. These polymers may be either of the thermoplastic type or the thermosetting crosslinking type. Suitable alkyl esters of acrylic acid or methacrylic acid include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. Acrylic polymers can be prepared via aqueous emulsion polymerization techniques and used directly in the preparation of the aqueous coating compositions, or can be prepared via organic solution polymerization techniques with groups capable of salt formation such as acid or amine groups. Upon neutralization of these groups with a base or acid the polymers can be dispersed into aqueous medium.

Where the polymer is of the crosslinking type, suitable functional monomers may be used in addition to the other acrylic monomers mentioned above and include, for example, acrylic acid, methacrylic acid, hydroxyalkyl acrylates, and hydroxyalkyl methacrylates. The coating composition in such cases contains a crosslinking agent such as an aminoplast. Other crosslinking agents such as polyisocyanates including blocked polyisocyanates may also be used. Also, the acrylic polymer can be prepared with N-(alkoxymethyl)acrylamides and N-(alkoxymethyl)methacrylamides which result in self-crosslinking acrylic polymers.

Besides acrylic polymers, the resinous binder for the coating composition may be an alkyd resin or a polyester. Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylol propane, and pentaerythritol.

Suitable polycarboxylic acids include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

Where it is desired to produce air-drying alkyd resins, suitable drying oil fatty acids may be used and include those derived from linseed oil, soya bean oil, tall oil, dehydrated castor oil, or tung oil.

The polyesters and preferably the alkyd resins contain a portion of free hydroxyl and/or carboxyl groups which are available for further crosslinking reactions. Suitable crosslinking agents are the amine or amide-aldehyde condensates (aminoplasts) or the polyisocyanate curing agents as are well known in the art.

Polyurethanes can also be used as the resinous binder of the coating composition. Among the polyurethanes which can be used are polymeric polyols which are prepared by reacting the polyester polyols or acrylic polyols such as those mentioned above with a polyisocyanate such that the OH/NCO equivalent ratio is greater than 1:1 so that free hydroxyl groups are present in the product.

The organic polyisocyanate which is used to prepare the polyurethane polyol can be an aliphatic or an aromatic polyisocyanate or a mixture of the two. Diisocyanates are preferred, although higher polyisocyanates can be used in place of or in combination with diisocyanates.

Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate.

Usually the polyester and polyurethane are prepared with unreacted carboxylic acid groups, which upon neutralization with bases such as amines allows for dispersion into aqueous medium.

Waterborne coating compositions are disclosed in U.S. Pat. No. 4,403,003, and the polymeric resinous compositions used in preparing these compositions can be used as the polymeric film-forming resin in the practice of this invention. Also, water-based polyurethanes such as those prepared in accordance with U.S. Pat. No. 4,147,679 can be used as the polymeric film-forming resin in the coating composition of the present invention. Further, it is possible to prepare an aqueous dispersion of a blend of acrylic and polyester and/or polyurethane materials in microparticulate form by a high stress technique using a homogenizer. This technique is preferably used to prepare the coating composition of the present invention and is described in U.S. Pat. No. 5,071,904. In this technique, the polymeric film-forming resin is a latex which comprises polymeric microparticles prepared by forming a mixture in aqueous medium of an ethylenically unsaturated monomer or mixture of ethylenically unsaturated monomers with greater than 30 percent by weight of a substantially hydrophobic polymer; the percent by weight being based on weight of ethylenically unsaturated monomer(s) and hydrophobic polymer. The hydrophobic polymer is essentially free of repeating acrylic or vinyl units in the polymer backbone and has a molecular weight of greater than about 300. The hydrophobic polymer is preferably a polyester or polyurethane. The monomer(s) and hydrophobic polymer are particularized into microparticles by high stress techniques using a homogenizer followed by polymerizing the ethylenically unsaturated monomer(s) to form polymeric microparticles which are stably dispersed in the aqueous medium. These microparticles can be internally crosslinked so as to form microgels.

Although the waterborne coating composition of the present invention may be cationic, anionic, or nonionic, preferably it is anionic.

As mentioned above, the waterborne coating composition of the present invention further includes from about 0.1 percent to about 5 percent, preferably about 1 to 3 percent of an oligomeric material containing from about two to about four urethane, urea, or amide moieties per molecule, and two or more moieties selected from the group consisting of hydroxyl and tertiary amine, the percentage being by weight based on weight of resin solids. Preferably, the oligomeric material has groups of the following structure:

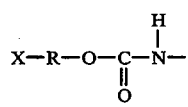 (I)

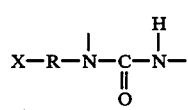 (II)

or

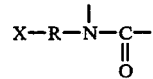 (III)

where X is a tertiary amine or a hydroxyl group and R is a divalent organic radical. R is preferably an alkylene group containing from about 2 to 20, preferably 2 to 10 carbon atoms. More preferably, the oligomeric material is of the structure:

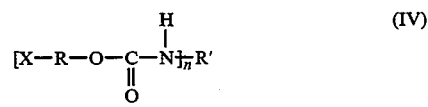 (IV)

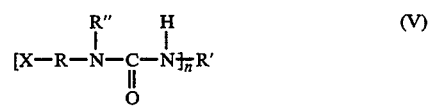 (V)

or

 (VI)

where X and R are as described above, n is equal to 2, 3, or 4, preferably 2 or 3; R' is an organic divalent, trivalent or tetravalent radical containing from about 6 to 25 carbon atoms, preferably R' is aliphatic, cycloaliphatic, or aromatic, and more preferably is aliphatic. R" is hydrogen or lower alkyl having 1 to 4 carbon atoms.

The oligomeric material can be prepared by reacting an organic polyisocyanate with a hydroxyl-containing tertiary amine, with a polyol, with an alkanol amine, or with a diamine containing primary or secondary amine groups and a tertiary amine group. Suitable polyisocyanates include aliphatic or aromatic polyisocyanates. Diisocyanates are preferred, although higher polyisocyanates can be used. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate and cycloaliphatic diisocyanates including isophorone diisocyanate and 4,4'-methylene-bis-(cyclohexyl isocyanate). Examples of suitable higher polyisocyanates are 1,2,4-benzene triisocyanate, polymethylene polyphenyl isocyanate and the isocyanurate of isophorone diisocyanate. Isophorone diisocyanate is preferred.

Examples of hydroxyl-containing tertiary amines are those containing aliphatic, cycloaliphatic, or aromatic moieties and hydroxyl functionality such as dimethyl ethanolamine and diethyl ethanolamine, which yield oligomeric materials having structures I and IV.

Examples of polyols are those containing aliphatic, cycloaliphatic, or aromatic radicals and hydroxyl groups and include ethylene glycol, propylene glycol, butylene glycol, 1,6-hexylene glycol, neopentyl glycol, diethylene glycol, glycerol, trimethylol propane, and pentaerythritol. When using polyols such as ethylene glycol and propylene glycol to yield oligomeric materials having structures I and IV, a stoichiometric excess of polyol should be used to ensure oligomer formation and to minimize polymer formation.

Examples of alkanol amines are diethanol amine and diisopropanol amine which yield oligomeric materials having structures II and V.

Examples of diamines containing a primary or secondary amine group and a tertiary amine group are dimethylaminopropyl amine and dimethylaminoethyl amine, yielding oligomeric materials having structures II and V.

Besides reacting organic polyisocyanates with the amines and hydroxyl functional materials mentioned above, oligomeric materials can be obtained by reacting organic polycarboxylic acids with primary or secondary amines containing hydroxyl groups or tertiary amine groups to form amides having structures III and VI. Examples of suitable polycarboxylic acids are aliphatic or aromatic polycarboxylic acids or mixtures thereof. Dicarboxylic acids are preferred although higher polycarboxylic acids can be used in place of or in combination with dicarboxylic acids. Anhydrides of dicarboxylic acids may also be used. Examples of suitable dicarboxylic acids and anhydrides include succinic acid, adipic acid, sebacic acid, hexahydrophthalic anhydride, and phthalic anhydride. Examples of suitable primary or secondary amines containing hydroxyl groups or tertiary amine groups are 2-amino-2-ethyl 1,3-propanediol, 2-amino-2-methyl-1-propanol, diethanol amine, diisopropanol amine, ethanol amine, N-methyl ethanol amine, and dimethylaminopropyl amine.

The oligomeric materials of the present invention may be cationic, anionic, or nonionic, but are preferably nonionic and typically have number average molecular weights of about 400 to 1000.

The coating composition can optionally contain pigments to give it color. Color pigments conventionally used in surface coatings include inorganic pigments such as titanium dioxide, iron oxide, chromium oxide, lead chromate, and carbon black, and organic pigments such as phthalocyanine blue and phthalocyanine green.

Compositions containing metallic flake pigmentation are useful for the production of so-called "glamour metallic" finishes chiefly upon the surface of automobile bodies. Suitable metallic pigments include in particular aluminum flake, copper bronze flake and metal oxide coated mica.

In general, the pigment is incorporated into the coating composition in amounts of about 1 to 80 percent, usually about 1 to 30 percent by weight based on total weight of the coating composition. When metallic pigments are used, they are added in relatively small amounts and preferably in combination with nonmetallic pigments. Nonmetallic pigments are most preferred.

The oligomeric material of the present invention is added to the coating composition neat; that is, it is added by itself or in other resinous ingredients, or with solvents or other diluents. Preferably, it is not added in association with the pigment or as part of the grind vehicle.

If desired, the coating composition may contain other optional materials well known in the art of formulated surface coatings. These would include crosslinking agents, surfactants, flow control agents, thixotropic agents, fillers, anti-gassing agents, organic cosolvents, catalysts, and other customary auxiliaries. These materials can constitute up to 40 percent by weight of the total weight of the coating composition.

Coating compositions of the present invention can be applied to various substrates to which they adhere, including wood, metals, glass, cloth plastic, foam, including elastomeric substrates and the like. They are particularly useful in applying over metals and elastomeric substrates that are found on motor vehicles. The compositions can be applied by conventional means including brushing, dipping, flow coating, spraying and the like, but they are most often applied by spraying. The usual spray techniques and equipment for air spraying and electrostatic spraying and either manual or automatic methods can be used.

During application of the coating composition to the substrate, ambient relative humidity may range from about 30 to about 80 percent. The coating composition of the present invention is particularly advantageous when applied at an ambient relative humidity ranging from about 30 to about 60 percent, yielding very smooth finishes.

A film of the coating is formed on the substrate during application of the coating composition to the substrate. Typically, the coating thickness will be about 0.1 to 5 mils (2.54 to 127 microns), preferably 0.4 to 1.5 mils (10.16 to 38.1 microns) in thickness.

After application of the waterborne coating to the substrate, a film is formed on the surface of the substrate by driving water out of the film by heating or by an air drying period. When the coating composition of the present invention is used as a base coat, the heating will preferably be only for a short period of time and will be sufficient to ensure that a topcoat such as a clearcoat can be applied to the coating if desired without the former dissolving the base coat composition. Suitable drying conditions will depend on the particular base coat composition and on the ambient humidity, but in general a drying time of from about 1 to 5 minutes at a temperature of about 80°–250° F. (20°–121° C.) will be adequate to ensure that mixing of the two coats is minimized. At the same time, the base coat film is adequately wetted by the topcoat composition so that satisfactory intercoat adhesion is obtained. Also, more than one base coat and multiple top coats may be applied to develop the optimum appearance. Usually between coats, the previously applied coat is flashed; that is, exposed to ambient conditions for about 1 to 20 minutes.

After application of the coating composition and any desired clearcoats, the coated substrate is heated to cure the coating layers. In the curing operation, solvents are driven off and the film-forming materials of the clearcoat and the base coat are each crosslinked. The heating or curing operation is usually carried out at a temperature in the range of from 160°–350° F. (71°–177° C.) but if needed, lower or higher temperatures may be used as necessary to activate crosslinking mechanisms. The thickness of the clearcoat is usually from about 0.5–5 mils (12.7 to 127 microns), preferably 1.2–3 mils (30.48 to 76.2 microns).

The invention will further be described by reference to the following examples. Unless otherwise indicated, all parts are by weight.

Examples A to E illustrate the preparation of the oligomeric material of the present invention.

EXAMPLE A

The following ingredients were used to prepare an oligomeric material:

| Ingredient | Weight, g | Equivalents | Percent by weight |
|---|---|---|---|
| Dimethyl ethanolamine | 890.00 | 1.000 | 44.49% |

-continued

| Ingredient | Weight, g | Equivalents | Percent by weight |
|---|---|---|---|
| Isophorone diisocyanate (IPDI) | 1104.45 | 0.995 | 55.20% |
| α,α'-Tetramethylxylene diisocyanate (TMXDI) | 6.16 | 0.005 | 0.31% |

A blend of methyl isobutyl ketone (MIBK, 480 g) and the dimethyl ethanolamine was charged to a suitable reactor and heated to 50° C. The heat source was then removed. A blend of the IPDI and the TMXDI was added through an addition funnel over a period of two hours. Additionally, 10 grams of MIBK was added as a rinse through the addition funnel. The temperature of the reaction mixture was maintained at 50° to 60 ° C. by varying the rate of addition. After the addition was complete the reaction mixture was heated to 80° C. and held at that temperature until infrared analysis indicated consumption of the isocyanate. The reaction mixture was cooled slightly and 10 grams of ethyl alcohol were added. The final product had a solids content of about 82 percent and a number average molecular weight of 393 as measured by gel permeation chromatography using polystyrene as a standard.

EXAMPLE B

The following ingredients were used to prepare an oligomeric material:

| Ingredient | Weight, g | Equivalents | Percent by weight |
|---|---|---|---|
| Dimethyl ethanolamine | 130.68 | 1.000 | 26.23% |
| T11890L[1] | 525.00 | 1.000 | 73.77% |

[1]Isophorone diisocyanate trimer, available from Miles, Inc.

A 70% solution of T1890L in 2:1 butyl acetate/SOLVESSO 100 (Solvesso 100 is an aromatic hydrocarbon commercially available from Exxon Chemical Co.)was charged to a suitable reactor and blanketed with nitrogen. Dimethyl ethanolamine was added through an addition funnel over a period of two hours. When no exothermic reaction was observed, the reaction mixture was heated to 50° C. and then slowly increased in temperature to 80° C. Additionally, 10 grams of butyl acetate was added as a rinse through the addition funnel. The temperature of the reaction mixture was maintained at 80° C. for four hours until infrared analysis indicated consumption of the isocyanate. The reaction mixture was cooled slightly and 10 grams of ethyl alcohol were added. The final product had a solids content of about 78 percent and a number average molecular weight of 1131 as measured by gel permeation chromatography using polystyrene as a standard.

EXAMPLE C

The following ingredients were used to prepare an oligomeric material:

| Ingredient | Weight, g | Equivalents | Percent by weight |
|---|---|---|---|
| Diisopropanolamine (DIPA) | 599.36 | 1.000 | 54.51% |
| IPDI | 497.45 | 0.995 | 45.24% |
| TMXDI | 2.77 | 0.005 | 0.25% |

A blend of MIBK (557.08 g ) and the DIPA was charged to a suitable reactor and heated to 50° C. The heat source was then removed. A blend of the IPDI and the TMXDI was added through an addition funnel over a period of two hours. Additionally, 25 grams of MIBK was added as a rinse through the addition funnel. The temperature of the reaction mixture was maintained at 50° to 60° C. by varying the rate of addition. After the addition was complete the reaction mixture was heated to 80° C. and held at that temperature until infrared analysis indicated consumption of the isocyanate. The reaction mixture was cooled slightly and 10 grams of ethyl alcohol were added. The final product had a solids content of about 70 percent and a number average molecular weight of 545 as measured by gel permeation chromatography using polystyrene as a standard.

EXAMPLE D (COMPARATIVE)

The following ingredients were used to prepare an oligomeric material:

| Ingredient | Weight, g | Equivalents | Percent by weight |
|---|---|---|---|
| Dibutylamine | 387.75 | 1.000 | 53.76% |
| IPDI | 331.63 | 0.995 | 45.98% |
| TMXDI | 1.85 | 0.005 | 0.26% |

A blend of MIBK (358.36 g) and the dibutylamine was charged to a suitable reactor and heated to 50° C. The heat source was then removed. A blend of the IPDI and the TMXDI was added through an addition funnel over a period of two hours. After 1.25 hours the reaction mixture had solidified and the temperature was increased to 85° C. to melt the material. The addition was then completed. Additionally, 20 grams of MIBK was added as a rinse through the addition funnel. After the addition was complete the reaction mixture was held at 85° C. until infrared analysis indicated consumption of the isocyanate. The reaction mixture was cooled slightly and 10 grams of ethyl alcohol were added. The final product had a solids content of about 69 percent and a number average molecular weight of 492 as measured by gel permeation chromatography using polystyrene as a standard.

EXAMPLE E

The following ingredients were used to prepare an oligomeric material:

| Ingredient | Weight, g | Equivalents | Percent by weight |
|---|---|---|---|
| Dimethylaminopropylamine (DMAPA) | 306.54 | 1.000 | 47.90% |
| IPDI | 331.63 | 0.995 | 51.81% |
| TMXDI | 1.85 | 0.005 | 0.29% |

A blend of MIBK (557.08 g) and the DMAPA was charged to a suitable reactor and heated to 50° C. The heat source was then removed. A blend of the IPDI and the TMXDI was added through an addition funnel over a period of two hours. Additionally, 20 grams of MIBK was added as a rinse through the addition funnel. The temperature of the reaction mixture was maintained at 50° to 60° C. by varying the rate of addition. After the addition was complete the reaction mixture was heated to 80° C. and held at that temperature until analysis indicated consumption of the isocyanate. The reaction mixture was cooled slightly and 10 grams of ethyl alcohol were added. The final product had a solids content of about 67 percent and a number average molecular weight of 745 as measured by gel permeation chromatography using polystyrene as a standard.

The following examples (1 to 14) illustrate the use of the oligomeric materials in the coating composition of the present invention.

EXAMPLE 1 (CONTROL, NO ADDITIVES)

A waterborne coating composition was prepared with the following ingredients:

|  | Ingredient | Weight, g |
|---|---|---|
| Premix 1: | Ethylene glycol monohexyl ether | 19.6 |
|  | Diethylene glycol monobutyl ether | 11.1 |
|  | CYMEL 385[1] | 31.32 |
|  | TINUVIN 1130[2] | 3.2 |
|  | Mica pigment[3] | 5.34 |
| Premix 2: | Black pigment[4] | 52.99 |
|  | Magenta pigment[5] | 25.5 |
|  | Maroon pigment[6] | 7.36 |
|  | Polypropylene glycol[7] | 7.9 |
|  | Shell Sol 71[8] | 11.6 |
| Premix 3: | Latex[9] | 113.3 |
|  | Deionized water | 50 |
|  | Dimethylethanolamine, 50% in deionized water | 2 |

[1]Melamine formaldehyde resin available from CYTEK Industries, Inc.
[2]Substituted hydroxyphenyl benzotriazole available from Ciba-Geigy Corp.
[3]Iron oxide coated mica platelets available from The Mearle Corp. as Exterior Mearlin Russet
[4]Black pigment available from Cabot Corp. as Monarch Black 1300, dispersed in an acrylic grind vehicle at a pigment to binder ratio (P/B) of 0.28
[5]Quinacridone pigment available from Ciba-Geigy Corp. as Monastral Magenta 202, dispersed in a polyurethane grind vehicle at a P/B of 0.79
[6]Perylene pigment available from Miles, Inc., as Perrindo Maroon 179, dispersed in an acrylic grind vehicle at a P/B of 0.57
[7]Molecular weight 425.
[8]Mineral spirits available from Shell Chemical Co.
[9]Prepared according to U.S. Pat. No. 5,071,904, see Example I.

Premixes 1 and 2 were prepared separately and Premix 2 was added to Premix 1 under agitation. Premix 3 was prepared and added to the Premix ½ mixture. The final composition had a solids content of 30.8%, a pH of 8.4, and a viscosity of 24 seconds, measured using a #4 Ford cup.

EXAMPLE 2

A waterborne coating composition was prepared as in Example 1, and the oligomeric material of Example A was added at 0.25% on total resin solids. The final composition had a solids content of 30.7%, a pH of 8.4, and a viscosity of 24.1 seconds.

EXAMPLE 3

A waterborne coating composition was prepared as in Example 1, and the oligomeric material of Example A was added at 0.50% on total resin solids. The final composition had a solids content of 30.6%, a pH of 8.4, and a viscosity of 23.9 seconds.

EXAMPLE 4

A waterborne coating composition was prepared as in Example 1, and the oligomeric material of Example A was added at 0.75% on total resin solids. The final composition had a solids content of 30.5%, a pH of 8.4, and a viscosity of 23.8 seconds.

EXAMPLE 5

A waterborne coating composition was prepared as in Example 1, and the oligomeric material of Example A was added at 1.0% on total resin solids. The final composition had a solids content of 30.6%, a pH of 8.4, and a viscosity of 24.1 seconds.

EXAMPLE 6

A waterborne coating composition was prepared as in Example 1, and the oligomeric material of Example A was added at 3.0% on total resin solids. The final composition had a solids content of 30.0%, a pH of 8.5, and a viscosity of 24 seconds.

EXAMPLE 7

A waterborne coating composition was prepared as in Example 1, and the oligomeric material of Example A was added at 5.0% on total resin solids. The final composition had a solids content of 29.3%, a pH of 8.6, and a viscosity of 23.9 seconds.

EXAMPLE 8

A waterborne coating composition was prepared as in Example 1, and a hydroxyalkylamide available from Rohm and Haas Co. as PRIMID XL-552 was added at 3.0% on total resin solids. The final composition had a solids content of 30.8%, a pH of 8.4, and a viscosity of 24.5 seconds.

PRIMID XL-552 is believed to have the structure:

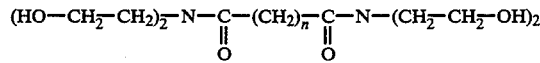

where n is 4.

EXAMPLE 9 (CONTROL, NO ADDITIVES)

A waterborne coating composition was prepared from the following ingredients:

|  | Ingredient | Weight, g |
|---|---|---|
| Premix 1: | Ethylene glycol monohexyl ether | 20.9 |
|  | Diethylene glycol monobutyl ether | 5.0 |
|  | CYMEL 385 | 28.2 |
|  | TINUVIN 1130 | 2.9 |
| Premix 2: | Mica pigment | 3.9 |
|  | White pigment[1] | 0.28 |
|  | Blue pigment[2] | 16.8 |
|  | Maroon pigment[3] | 37.5 |
|  | Red pigment[4] | 1.8 |
|  | Magenta pigment | 42.7 |
|  | Polypropylene glycol | 5.2 |
|  | Shell Sol 71 | 9.3 |
| Premix 3: | Latex | 81.1 |
|  | Deionized water | 89.0 |
|  | Bentone 34[5] | 23.4 |
|  | Dimethylethanolamine, 50% in deionized water | 2 |

[1]Titanium dioxide rutile available from E. I. du Pont de Nemours and Co. as R900-39/76, dispersed in an acrylic grind vehicle at a P/B of 8.33
[2]Available from BASF Corp. as Paliogen Blue, dispersed in an acrylic grind vehicle at a P/B of 0.42
[3]Quinacridone pigment available from Ciba-Geigy Corp. as Monastral Maroon RT 792D, dispersed in a polyurethane grind vehicle at a P/B of 0.54
[4]Available from BASF Corp. as Sicotrans Red L 2817, dispersed in an acrylic grind vehicle at a P/B of 0.72
[5]Organic derivative of Montmorillonite clay available from Rheox, Inc.

Premixes 1 and 2 were prepared separately and Premix 2 was added to Premix 1 under agitation. Premix 3 was prepared and added to the Premix ½ mixture. The final composition had a solids content of 31.4%, a pH of 8.4, and a viscosity of 24 seconds, measured using a #4 Ford cup.

EXAMPLE 10

A waterborne coating composition was prepared as in Example 9, and the oligomeric material of Example A was added at 3.0% on total resin solids.

EXAMPLE 11

A waterborne coating composition was prepared as in Example 9, and the oligomeric material of Example B was added at 3.0% on total resin solids.

EXAMPLE 12

A waterborne coating composition was prepared as in Example 9, and the oligomeric material of Example C was added at 3.0% on total resin solids.

EXAMPLE 13 (COMPARATIVE)

A waterborne coating composition was prepared as in Example 9, and the oligomeric material of Example D was added at 3.0% on total resin solids.

EXAMPLE 14

A waterborne coating composition was prepared as in Example 9, and the oligomeric material of Example E was added at 3.0% on total resin solids.

The coating compositions of Examples 1 to 8 were spray applied to electrocoated steel panels at room temperature (67° F.) and at a relative humidity of 25%. The coating compositions of Examples 9 to 14 were spray applied to electrocoated steel panels at room temperature (67° F.) and at a relative humidity of 40%. Each panel was given a 15 minute flash at room temperature and then cured for 30 minutes at 285° F.

The films were evaluated for smoothness using a Taylor-Hobson Surtronic 3 profilometer. Lower numbers indicate greater smoothness. The results are reported in Tables I and II below.

TABLE I

| Example: | DFT[1] | Profilometer rating |
| --- | --- | --- |
| 1 (CONTROL) | 0.55 (13.97) | 37.4 |
| 2 | 0.52 (13.21) | 35.2 |
| 3 | 0.53 (13.46) | 29.6 |
| 4 | 0.56 (14.22) | 32.6 |
| 5 | 0.51 (12.95) | 32 |
| 6 | 0.52 (13.21) | 26.4 |
| 7 | 0.53 (13.46) | 16.4 |
| 8 | 0.52 (13.21) | 26.4 |

[1] Dry film thickness, in mils (microns)

TABLE II

| Example: | DFT | Profilometer rating |
| --- | --- | --- |
| 9 (CONTROL) | 0.58 (14.73) | 39 |
| 10 | 0.60 (15.24) | 13.5 |
| 11 | 0.53 (13.46) | 31.5 |
| 12 | 0.61 (15.49) | 27.2 |
| 13 (COMPARATIVE) | 0.62 (15.75) | 43.2 |
| 14 | 0.59 (14.99) | 11.75 |

We claim:

1. A waterborne coating composition comprising a polymeric film-forming resin in aqueous medium and from about 0.1 percent to about 5 percent of an oligomeric material containing from about two to about four urethane, urea or amide moieties per molecule, and two or more moieties selected from the group consisting of hydroxyl and tertiary amine.

2. The waterborne coating composition of claim 1 further comprising a crosslinking agent.

3. The waterborne coating composition of claim 1 in which the oligomeric material has groups of the following structure:

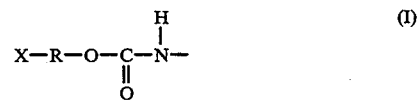

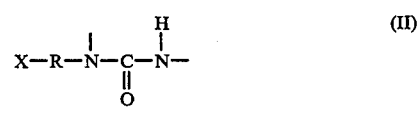

or

where X is a tertiary amine or a hydroxyl group and R is a divalent organic radical.

4. The waterborne coating composition of claim 3 in which the oligomeric material is of the structure:

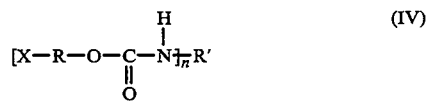

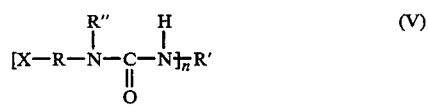

or

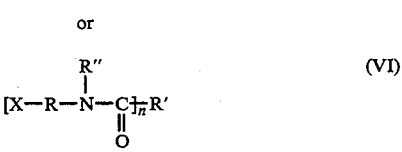

where X is a tertiary amine or a hydroxyl group, R is a divalent organic radical, n=2, 3, or 4; R' is an organic divalent, trivalent, or tetravalent radical, and R" is hydrogen or lower alkyl having 1 to 4 carbon atoms.

5. The waterborne coating composition of claim 3 in which R is alkylene containing from about 2 to 10 carbon atoms.

6. The waterborne coating composition of claim 3 in which R' is selected from aliphatic, including cycloaliphatic, and aromatic radicals.

7. The waterborne coating composition of claim 3 further comprising a crosslinking agent.

8. The waterborne coating composition of claim 1 wherein the polymeric film-forming resin is a latex which comprises polymeric microparticles prepared by forming a mixture in aqueous medium of an ethylenically unsaturated monomer or mixture of ethylenically unsaturated monomers with greater than 30 percent by weight of a substantially hydrophobic polymer selected from the group consisting of a polyester and a polyurethane; the percent by weight being based on weight of ethylenically unsaturated monomer(s) and hydrophobic polymer; said polymer being essentially free of repeating acrylic or vinyl units in the polymer backbone, and particularizing the mixture into microparticles by high stress techniques followed by polymerizing the ethylenically unsaturated monomer(s) to form the microparticles which are stably dispersed in the aqueous medium.

9. The waterborne coating composition of claim 8 wherein the hydrophobic polymer is a polyester or a polyurethane.

10. The waterborne coating composition of claim 8 wherein the microparticles are crosslinked.

11. The waterborne coating composition of claim 8 further comprising a crosslinking agent.

* * * * *